(12) United States Patent
Hamza

(10) Patent No.: US 6,934,422 B2
(45) Date of Patent: Aug. 23, 2005

(54) METHODS, DATA, AND SYSTEMS TO WARP AN IMAGE

(75) Inventor: Rida M. Hamza, Inver Grove Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 638 days.

(21) Appl. No.: 10/025,448

(22) Filed: Dec. 18, 2001

(65) Prior Publication Data

US 2003/0118251 A1 Jun. 26, 2003

(51) Int. Cl.$^7$ ................................................. G06K 9/32
(52) U.S. Cl. ........................ 382/293; 382/298; 345/660
(58) Field of Search ................................. 382/277, 293, 382/298, 308; 345/640, 646, 647, 660

(56) References Cited

U.S. PATENT DOCUMENTS

| | | | |
|---|---|---|---|
| 4,835,532 A | 5/1989 | Fant | 340/728 |
| 5,204,944 A | 4/1993 | Wolberg et al. | 395/127 |
| 5,264,838 A | 11/1993 | Johnson et al. | 345/138 |
| 5,594,676 A | 1/1997 | Greggain et al. | 364/24.01 |
| 5,684,935 A | 11/1997 | Demesa, III et al. | 395/119 |
| 6,188,800 B1 | 2/2001 | Okitsu | 382/276 |
| 6,670,965 B1 * | 12/2003 | McKeown | 345/660 |

OTHER PUBLICATIONS

Fant, Karl M., "A Nonaliasing, Real–Time Spatial Transform Technique", *IEEE Computer Graphics and Applications*, 6 (*1*), (1986), 71–80.

Wittenbrink, Craig M., et al., "2D and 3D Optimal Parallel Image Warping", *Journal of Parallel and Distributed Computing*, 25 (2), (Mar., 1995), 197–208.

\* cited by examiner

*Primary Examiner*—Amelia M. Au
*Assistant Examiner*—Wes Tucker
(74) *Attorney, Agent, or Firm*—Kris T. Fredrick (57) ABSTRACT

Methods, data, and systems are provided to warp an image. Input pixels associated with an input image are warped according to a provided or obtained warping function. A single weight is assigned to each input pixel. The weight represents each input pixel's horizontal and vertical dimensions within an output lattice. The single weight is combined with an intensity value associated with each input pixel to map each input pixel to the output lattice in a single processing pass.

35 Claims, 5 Drawing Sheets

FIG. 5

METHODS, DATA, AND SYSTEMS TO WARP AN IMAGE

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright©2001, Honeywell Inc., All Rights Reserved.

FIELD OF THE INVENTION

The present invention relates to image warping, and in particular to methods, data, and systems used to weight input pixels associated with an input image in two dimensions with a single processing pass to produce a warped image.

BACKGROUND OF THE INVENTION

Electronic images are often manipulated to produce variant forms of the images. For example, many existing off-the-shelf software image viewers and editors allow an image to be manipulated within a display for purposes of obtaining different perspective views of the image. Some viewing functions include zooming in on different locations within the image, panning out on different locations within the image, scaling the image by spatially reallocating the content of the image, rotating the image, and the like. Of course, image manipulation is also useful when printing images, mining the images for information, correcting distortions or creating distortions within the images, integrating the images into other software applications, image morphing and the like.

Manipulation of pixels within an image is a processor and memory expensive operation, since the number of pixels within a complete image is large, occupying a substantial amount of memory. The problem of decreased processing throughput associated with pixel manipulation, is exacerbated when an image has increased quality, since a better quality image indicates that the image includes more pixels. The number of pixels within an image is often described by the number of pixels included within a square inch of the image and is referred to as dots per square inch (DPI). As an image's DPI increases, the processing and memory required to manipulate the image increases as well.

Image manipulation is often referred to as image warping, and the existing techniques of warping an image into two dimensions require two processing passes on each pixel within the image. The first pass of the image produces an intermediate version of the source image where all the pixels within the source image are warped in one dimension or spatial transform (e.g., along the y-axis or vertical axis). The second pass occurs against the intermediate image produced from the first pass and warps all the pixels within the intermediate image in a second dimension (e.g., along the x-axis or horizontal axis). As one skilled in the art will recognize, a popular two-pass process for image warping is the FANT process. Moreover, as is readily apparent warping a two-dimensional image requires substantial processing and substantial temporary memory (e.g., volatile memory) to house the intermediate warped image.

As pixels within an image are warped in each direction, the original pixels must be mapped or transformed to the intermediate or final pixels. The process of determining this transformation is referred to as warping. Warping techniques are well known to those skilled in the art, and a variety of linear and non-linear techniques are widely available. For example, consider a linear warping technique of an input image having 100 pixels along the vertical axis that is to be mapped to a target image having 50 pixels along the vertical axis. The input image is warped by using a warping function that averages the intensity values associated with every 2 adjacent pixels in the input image. The single averaged intensity value is then mapped to the target image. Of course, the above example is for producing a one-dimensional transform, a second dimensional (e.g., spatial) transform would require an additional processing pass on the pixels, creating added latency.

Further, warping techniques can produce artifacts (e.g., defects or aliasing) in the resulting warped image, because any technique used is an approximation, and correspondingly the warping techniques are not error free. As a result, warped images often require additional filtering techniques to produce better quality warped images. Filtering techniques are also well known to those skilled in the art and are used to correct imprecise pixel mappings.

Furthermore, many of the most reliable non-linear warping techniques are produced independent of the process of mapping image pixels. Accordingly, these techniques often produce a mapping for a pixel in two dimensions. Yet, existing image warping processes, such as the FANT process, require warping to occur in two passes. Correspondingly, the FANT process must try to decompose the warping transformation function into two independent functions in order to process the image in two separate passes to accommodate the x-axis and y-axis warping. However, not all warping transformation functions can be separated into to separable functions along both the x and y axis.

A single warping function is said to be separable if the x axis warping can be independently separated from the y axis warping to produce two independent functions which when combined are identical to the original single warping function for both the x and y axis. Therefore, when a warping function is non separable, the FANT technique attempts to separate the x and y warping functions anyway, which results in artifacts being introduced into the warped image produced by the FANT technique. As one skilled in the art will appreciate, this introduces additional error into the FANT process and also limits the available warping algorithms, which the FANT process can utilize. Moreover, the existing FANT process requires pixel intensity values to be represented in floating point format, this further restricts the available warping algorithms, which are useable during an image warping process.

As is apparent there exists a need for improved image warping methods and systems to reduce the need for a dual pass warped image, requiring no intermediate memory and no filtering clean-up techniques. As is apparent, a dual pass warping technique also creates unnecessary process latency. Furthermore, there exists a need to use existing warping techniques without attempting to decompose the techniques into two independent functions with each decomposed function operating in a single dimension. Finally, a need exists to permit warping techniques to be used for pixels within a source image having fixed point representation.

SUMMARY OF THE INVENTION

A method to warp a pixel in two dimensions is provided, wherein the pixel coordinate pair is received having a first and second coordinate and an intensity value. A single two-dimensional pixel weight is identified by multiplying a first dimensional weight with a second dimensional weight. The pixel weight is used with the intensity value to warp the pixel coordinate pair to one or more target pixel coordinate pairs.

In another embodiment of the present invention a warped image residing in a computer readable medium is provided. The warped image includes one or more pixel lattices produced from a single-pass set of executable instructions. The single-pass set of executable instructions is operable to generate each pixel lattice from one or more source pixels, where each source pixel includes a weight representing a two-dimensional warping scale for each source pixel represented in the corresponding pixel lattice.

In still another embodiment of the present invention a system to warp a source image is provided. The system includes a plurality of input pixels, each input pixel having an intensity value and associated with a source image. Further, the system includes a warping set of executable instructions operable to process the input pixels to produce scaling data. Moreover, the system includes a plurality of destination lattices representing warped versions of the input pixels, which are produced by using the scaling data to assist in generating a single two-dimensional weight for each input pixel. Each input pixel's intensity value when combined with the single two-dimensional weight forms each of the destination lattices.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other means of providing information to the system for database storage.

Figure 1:
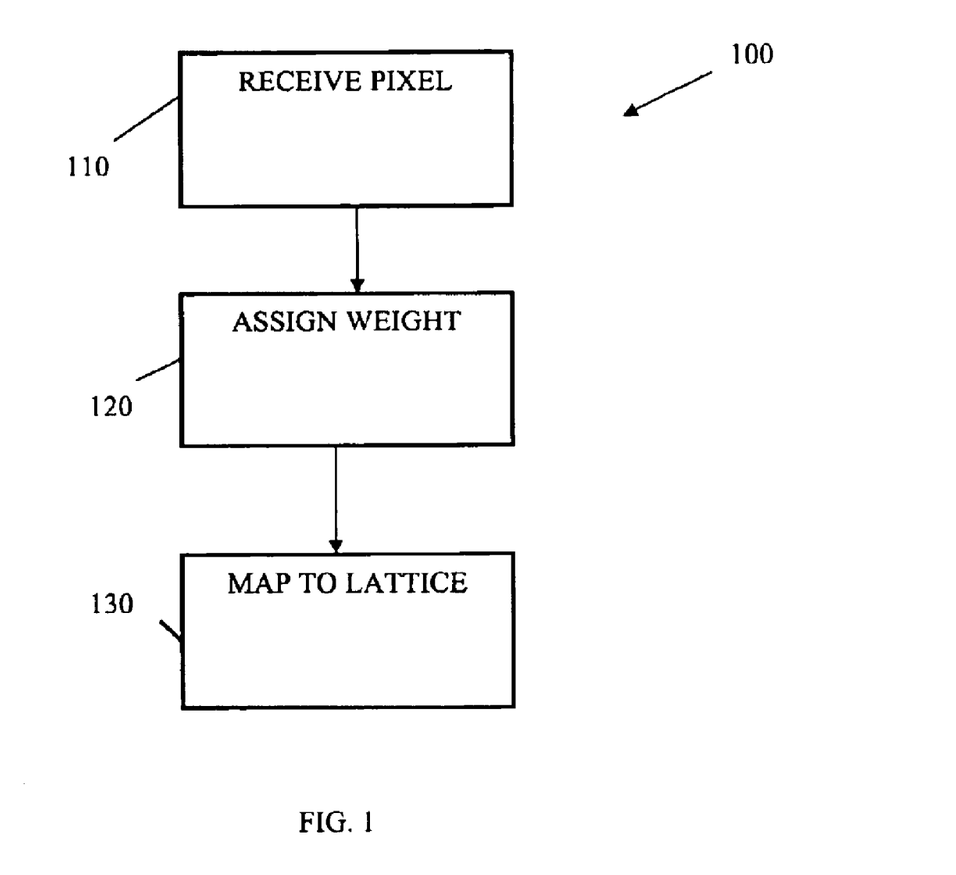
FIG. 1 is a flowchart representing a method of warping an image.

FIG. 1 shows one method 100 for warping an image according to the present invention. Initially, a source image is detected and each pixel is received in step 110. Next, any arbitrary, linear, non-linear, or non separable warping function known in the art or hereafter developed is obtained with the received pixel passed to the obtained function. The output of the function is a one-to-one mapping to a destination pixel along with a percentage of contribution or scaling factor of the received pixel to the destination pixel. Furthermore, this one-to-one mapping occurs with each of the x and y directions (e.g., horizontal and vertical directions/dimensions). The one-to-one mapping is typically represented as a floating-point number. The scaling factors of each successively received pixel, when compared against one another, combine to resolve the contributions that each received pixel must make when mapped to a destination lattice (e.g., directed matrix of a subset of pixels in the destination image) in order to achieve the desired warping.

For example, consider a single input pixel having an x and y coordinate pair identified by (1,1), which is passed to a warping function. The warping function produces a floating-point number, 0.75, representing a one-to-one mapping in the input pixel's x direction. Also, a second x and y coordinate pair identified by (2, 1) when passed to the warping function produces a floating-point mapping represented by the number 1.3. In some embodiments, the first outputted floating point number 0.75 is truncated to a whole integer, or 0 if less than 1. Therefore in the present example, since 0.75 is less than 1, 0 is used as the first pixel coordinate in the x direction for the destination pixel (e.g., where the destination pixels begin with a 0 coordinate and continues to n−1, where n is the number of pixels in the destination image). The non-integer value of the first outputted floating point number 0.75 indicates a scaling contribution/factor of the received pixel (1, 1) in the destination pixel position 0. This indicates that 0.75 of the received pixel associated with the x direction of the first coordinate pair (1, 1) is to occupy the $0^{th}$ position (e.g., actually first position) of the x direction for the destination pixel.

Of course, as is readily apparent the floating-point numbers in some embodiments are rounded to the next whole integer and not truncated. In this way, the output destination pixels are represented as beginning with 1 rather than 0. As is readily apparent, whether the floating-point mappings are truncated or rounded to an integer representation is not critical, and correspondingly any implementation may be used without departing from the tenets of the present invention.

Next, the second x and y coordinate pair's mapping 1.3 is received from the warping function. Truncating 1.3 produces a destination position having a value of 1 (e.g., actually the second physical position in the destination lattice along the x direction). Furthermore, a difference between the previous mapped value of 0.75 and the present mapped value of 1.3 produces a value of 0.55. However, the $0^{th}$ position of the destination pixel lattice along the x direction is only 75 percent completed (e.g. 0.75 ×100), correspondingly 25 percent (e.g. 0.75 −0.55×100) of the second coordinate pair's x direction is used to fill the $0^{th}$ position, and the remaining 30 percent (e.g. 0.55 −0.25 ×100) is used to fill the $1^{st}$ position. In this way as one skilled in the art will readily appreciate, the warping of the received pixels to the destination lattice is a continuous operation. Furthermore, the warping function and comparison above applies equally to the y direction for each received pixel, such that the warping occurs in 2 dimensions. Of course, the tenets of the present invention apply to any n-dimensional warping (where n is >=2).

If the comparison between previous mapped values to current mapped values for received pixels produces a value greater than 1, then the current received pixel is sufficient to fill multiple destination pixels and is said to be stretched. Moreover, in such a case the scaling factor is 1. Alternatively, a scaling factor less than 1 for a current received pixel is not sufficient to fill a single destination pixel and is therefore said to be compressed.

Once one or more comparisons are made, a single weight is assigned to the received pixel in step 120. If only a single pixel is weighted, the scaling factors produced from the warping function for both the x and y directions are multiplied together resulting in a single kernel weight for the single pixel. Of course for efficiency purposes when multiple received pixels are being warped to a destination lattice represented in a destination image, a single kernel weight comprises a matrix kernel weight, which is associated to one or more input pixels that define each pixels contribution to the destination lattice. Each single cell within the matrix identifies a product of each input pixel's x and y direction scaling factors.

For example, consider scaling factors of multiple input pixels which have been compared, as discussed above, to produce the vectors $W_y$=[0.6 1 0.4] along the y direction, and $W_y$=[0.75 0.25] along the x direction. A single kernel weight associated with the multiple input pixels, in some embodiments, is represented by the matrix product of the 2 vectors. Of course since $W_x$ is a 1×2 dimensional vector and $W_y$ is a 1×3 dimensional vector, $W_x$ needs to be transposed prior to vector multiplication, such that $W_x$ becomes a 2 ×1 dimensional vector. Correspondingly, the single kernel weight of the multiple input pixels is represented as:

$$W = \vec{W}_x^T \vec{W}_y = \begin{bmatrix} .45 & .75 & .3 \\ .15 & .25 & .1 \end{bmatrix}$$

Once a single two-dimensional kernel weight for a single received pixel or a collection of pixels (e.g., matrix W) is resolved in step 120, then the received pixel is mapped to a destination lattice (L) in step 130. As previously presented, L is a directed matrix contained or represented in the destination image. The location of a specific destination pixel is identified by the truncated or rounded integer value returned from the obtained warping function, as presented above. Moreover, coverage area associated with the specific destination pixel is achieved by the compare process described above. And, the specific intensity value associated with the mapped received pixel to a defined destination pixel with a defined coverage area is achieved by multiplying the received pixel's intensity value by the acquired kernel weight (e.g., W). The dimensions of L and W can vary from pixel to pixel.

As one skilled in the art will appreciate, the above-discussed method 100 reduces processing associated with warping an image, by performing a single operational pass on each pixel. Accordingly, no intermediate memory is required to house the image, and any provided warping function does not need to be decomposed to produce two independent functions for each dimension of the image. Furthermore, processing throughput is enhanced by manipulating a single pixel or collections of received pixels, with each pixel or collection of pixels mapped to a destination lattice, L and the resulting warped image comprising multiple L's.

Further as one skilled in the art will readily appreciate, although the above method 100 is discussed with respect to warping a two-dimensional image, any n-dimensional warping (where n is >=2) would benefit from the present invention, since the dimensions of W and L are not restricted to computations along only two dimensions.

Figure 2:
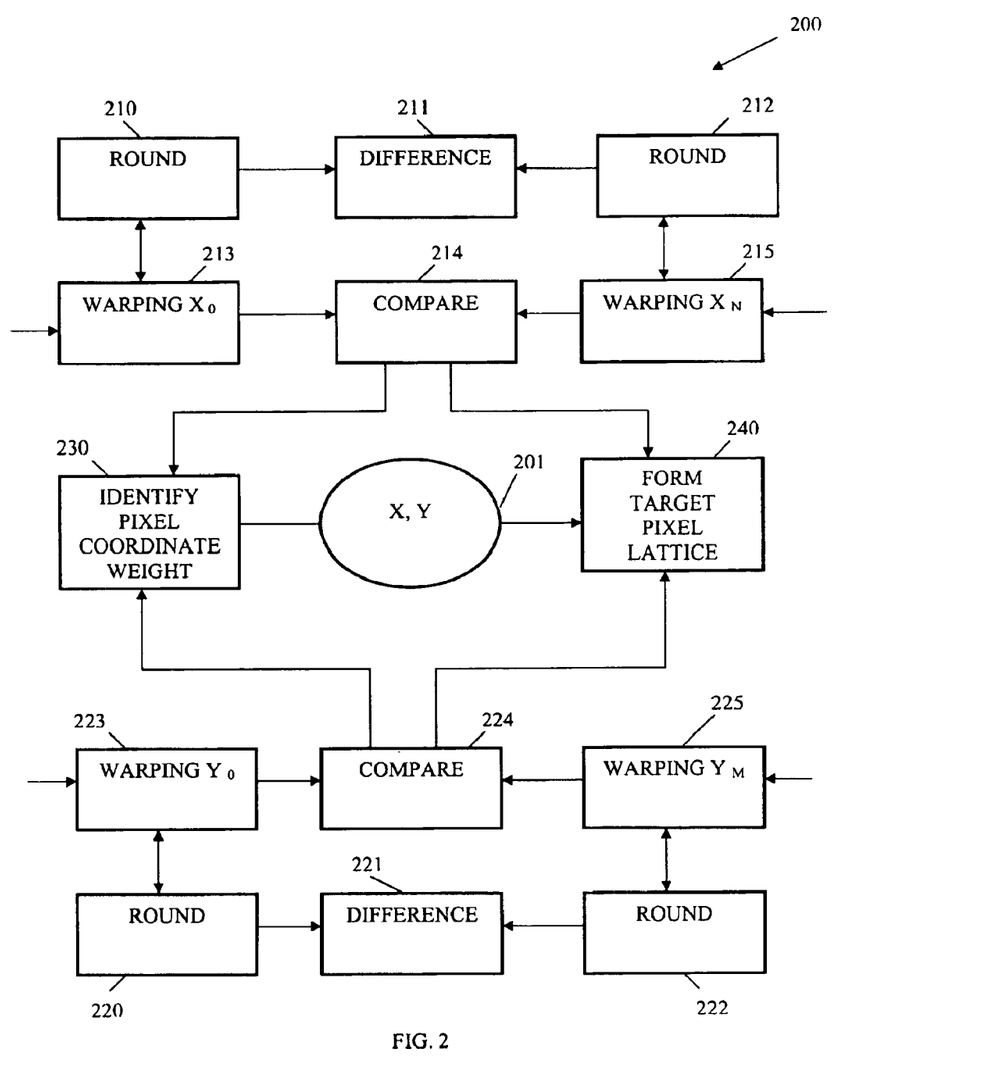
FIG. 2 is a flowchart representing a method of warping a pixel.

FIG. 2 shows a flowchart representing one method 200 for warping a pixel. Each pixel is identified with respect to its location within the image. The identification is achieved with pixel coordinates. Typically, a pixel coordinate is represented in two spatial dimensions, namely a horizontal dimension (e.g., x direction) and a vertical dimension (e.g., y direction). In some embodiments the two pixel coordinates combine to form a pixel coordinate pair 201 (e.g. (x,y)). The pixel coordinate pair uniquely identifies a pixel within an image. Although, a pixel coordinate pair 201 could be extended to include more than one dimension if such dimensions were relevant to warping. For example in some embodiments, warping images within a video stream includes a time dimension (z) associated with each pixel, such that a pixel coordinate pair is represented as (x, y, z). In other embodiments, a third or fourth dimension is used to represent water depth and altitude.

In steps 213, 215, 223, and 225, pixels are received. The x coordinate for an initial received pixel is received by an obtained warping function $x_0$ in step 213, while the corresponding y coordinate for an initially received pixel is received by the same or another warping function $y_0$ in step 233. Although, warping function $x_0$ and $y_0$ are depicted in FIG. 2 as separable functions, the present invention is not intended to be so limiting, since even a single non separable warping function can be used with the tenets of the present invention. In a like manner, the method 200 of FIG. 2 can process a last pixel associated with a source image, such that in step 215 a last x coordinate pixel is received by the obtained warping function $x_n$, and a last y coordinate pixel is received by the obtained warping function $y_m$, where m and n represent the source image dimension.

As any particular pixel coordinate pair 201 is received and processed, the difference (e.g., steps 211 and 224) between a most recently processed pixel coordinate pair's 201 coverage area in a produced target pixel lattice, along each axis, as compared with the required coverage area of the present processed pixel coordinate pair 201 is noted. Moreover, in some embodiments the coverage area of the target pixel lattice which is produced from the warping function(s) (e.g., 213, 215, 223, and 225) is rounded or truncated to a whole integer value in steps 210, 212, 220, and 222. Next in some embodiments, comparisons are made in steps 214 and 224, between most recently processed pixel's locations within the pixel lattice, along each axis, and a present processed pixel's desired location with the pixel lattice to generate vectors, as discussed above with FIG. 1.

Once the vectors are obtained, a single pixel coordinate weight is identified in some embodiments by multiplying an x direction vector with a y direction vector for the present processed pixel coordinate pair 201 in step 230. The resulting product assist in forming the target pixel lattice in step 240, as discussed above with FIG. 1.

Furthermore the warping functions depicted in FIG. 2 can include any linear, non-linear, separable, or non separable warping function that permits fixed-point or floating-point representations. Also, the pixel coordinate weight need not be represented in floating point, since fixed point representation works equally as well with the present invention. Additionally, as FIG. 2 illustrates each pixel and corresponding pixel coordinate pair 201 in the original source image being warped is successively and concurrently warped against previously processed pixel coordinate pairs 201 until all the remaining pixel coordinate pairs 201 are warped to all the remaining target pixel coordinate pairs. In this way, an entire source image is warped by making a single-pass of each pixel within the source image producing a two-dimensional warped target image.

In some embodiments, in step 224, the resulting x-pixel weight(s) and y-pixel weight(s) produced from the obtained warping function(s) are multiplied to produce a single product matrix, representing a single pixel weight for the pixel coordinate pair 201 along both the x-axis and the y-axis in step 230. Moreover, collections of pixel coordinate pairs, in other embodiments, are grouped together and a single kernel weight is obtained for the collections and represented as a larger matrix.

As depicted in FIG. 2, additional pixel coordinate pairs, in some embodiments, are processed from a source image until exhausted. Furthermore, in some embodiments the target pixels are logically associated to form a lattice or matrix in step 240. Moreover, the pixel may be compressed, stretched, rotated, scaled, transformed, or any combination thereof once the pixel is assigned the appropriate location within the target pixel lattice (e.g., step 240) and once the pixel coordinate pair 201 has obtained a single pixel coordinate weight (e.g., step 230).

Figure 3:
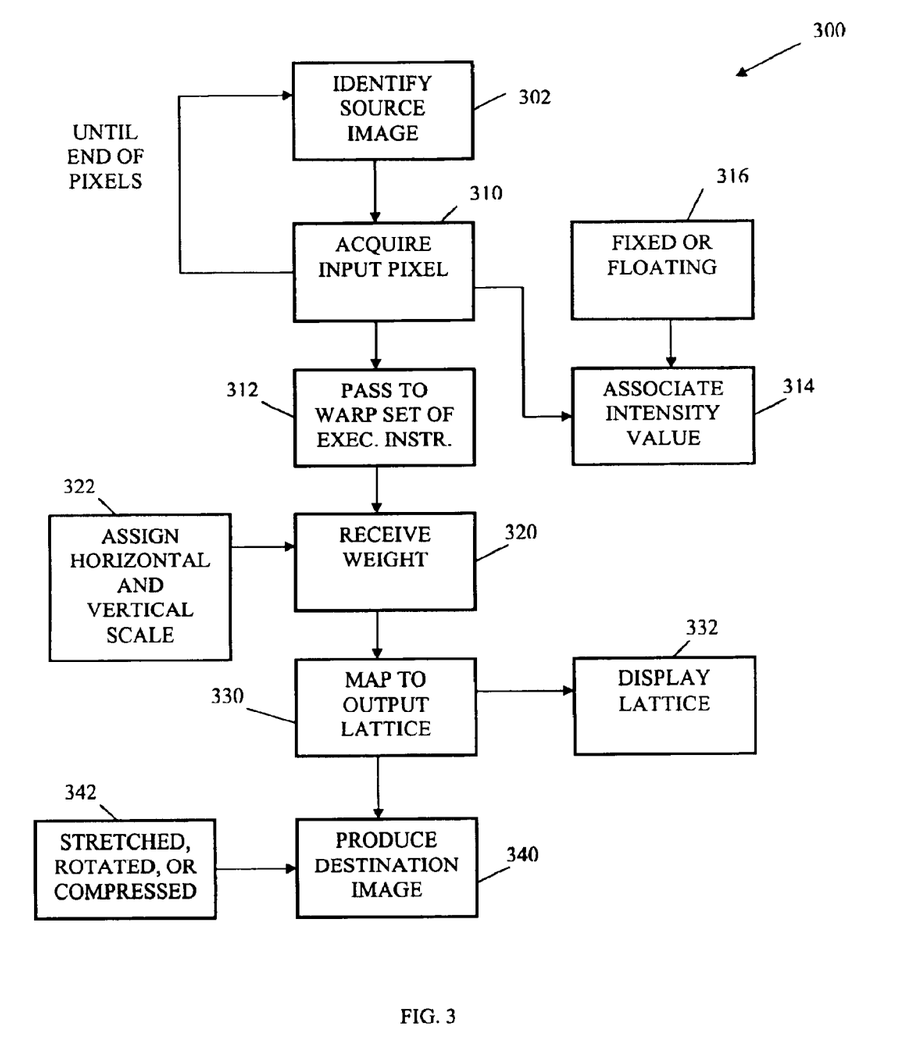
FIG. 3 is a flowchart representing another method of warping an image.

FIG. 3 shows one flowchart representing another method 300 for warping an image. In step 302 a source image is identified and in step 310 input pixels associated with the source image are acquired. Further in step 312, each acquired input pixel is passed to a warping set of executable instructions. As previously presented and in some embodiments, the output of the warping set of executable instructions, for a single pixel, is a single floating-point number for each input pixel. The integer portion of the floating-point number represents a location within an output lattice associated with a destination image. The decimal portion of the floating-point number represents a contribution or scale for each input pixel, as the input pixel is mapped to the output lattice.

Of course as is readily appreciated the output from the warping set of executable instructions, in some embodiments include fixed or floating-point representations, as depicted in step 316. For example, a fixed-point output representation is decomposed to produce both a scale and a destination pixel within the destination lattice. Decomposition includes any stable derivation, such as dividing the fixed-point number by a factor, with the resulting integer answer being the destination pixel coordinate and the remainder associated with the answer being the scale. Yet, as one skilled in the art will appreciate any arbitrary, linear, non-linear, separable, or non separable decomposition is readily acceptable and intended to fall within the scope of the present invention.

In step 314, each input pixel's intensity value is recorded. After the scales for one or more of the input pixels are acquired from the warping set of executable instructions in step 312, a weight for each input pixel is resolved by using the product of the scales in each dimension associated with each pixel value to produce a weight, as discussed above. The scales for each dimension associated with each input pixel is assigned in step 322 after being received from the warping set of executable instructions. In this way, a single input pixel includes a single weight that determines its contribution to for each associated destination pixel. In some embodiments, the dimensions associated with the pixel include an x dimension (e.g., horizontal dimension) and a y dimension (e.g., vertical dimension). A single weight for each input pixel is received in step 320.

In step 330, the input pixel is mapped to the output lattice by using the destination pixel location and scaling factors acquired from the warping set of executable instructions combined with the single received weight for the input pixel. The single weight is multiplied by the retained intensity value of the input pixel to determine the intensity value of the destination pixel as it is mapped and written to the output lattice. As will be appreciated by those skilled in the art, little to no intermediate memory is needed while mapping the input pixel to the output lattice with method 300, and the mapping operation is continuous. This increases processing throughput, reduces memory requirements associated with a processing set of executable instructions performing method 300 on one or more computer readable mediums using one or more processing elements. The processing set of executable instructions perform a single operational pass of the input pixels and produce a mapping to the output lattice, as discussed above.

The mapping from step 330 produces a destination image in step 340, after one or more of the input pixels are processed from the source image. Optionally, each input pixel included within the source image is acquired and processed by method 300 iteratively until no more input pixels require processing from the source image and a single destination image is produced from processing all source image input pixels. Furthermore in some embodiments, portions of the destination image represent stretched, rotated, and/or compressed portions of the source image, as depicted in step 342. Of course, the entire destination image in some embodiments is a compressed, rotated, or stretched representation of the source image Furthermore, in step 332 the lattice is displayed on an output medium. In some embodiments the display includes a computer monitor, printer, camera, television, control panel of a vehicle, aircraft, marine craft and the like. In other embodiments, the display includes intelligent apparel, such as eyeglasses or helmet visors operable to process and warp images within a view of the intelligent apparel. Further in some embodiments, the display is remote from the processing and memory associated with the output lattice.

Figure 4:
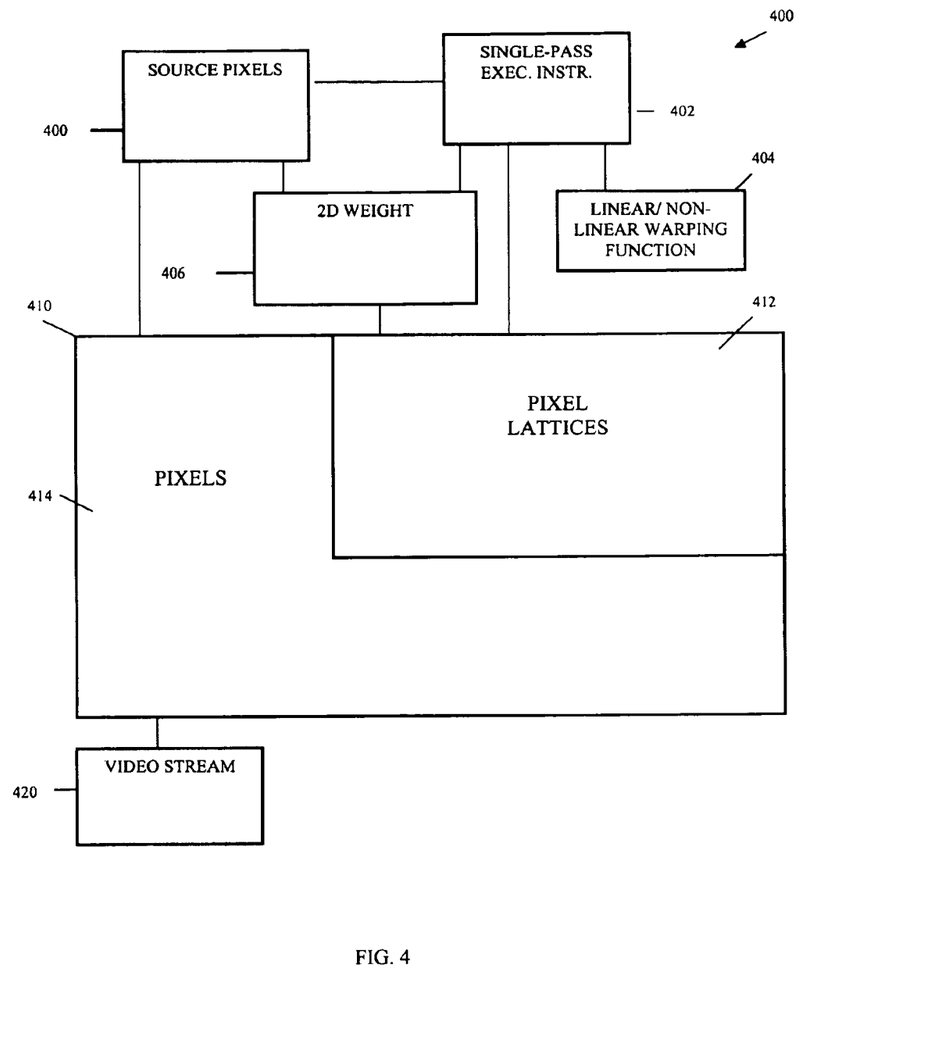
FIG. 4 is a block diagram of a warped image.

FIG. 4 shows one block diagram of a warped image 410 according to the teachings of the present invention. A single pass set of executable instructions 402 using a linear, non-linear, separable (e.g., can be decomposed into two functions, one is defined in the x axis and the other is defined in the y axis), or non separable warping function 404 processes a plurality of source pixels 400. The source pixels 400 are associated with a source image that is to be warped. The precise warping that is to take place is defined by the provided and/or selected warping function 404. As previously presented, a variety of well known warping functions are well known to those skilled in the art and all of which are intended to fall within the scope of the present invention.

After the warping function 404, provides a pixel location within the warped image 410, this provided location is associated with a specific pixel lattice 412 and correspondingly pixel 414 in the warped image 410. Furthermore, a two-dimensional weight 406 is calculated by the processing set of executable instructions 402, such that an intensity value for each source pixel 400 is multiplied by the two-dimensional weight 406 to determine the intensity value of the pixel location included within the warped image 410.

In some embodiments, the two-dimensional weight 406 is resolved by multiplying the returned individual scaling factors for each dimension of a source pixel 400 after processing by the provided warping function 404. Moreover, in other embodiments the two-dimensional weight 406 includes a matrix associated with a plurality of source pixel scales, as presented above. However although weights 406 are described as being the product of the individual scales associated with each dimension of a source pixel 400, as one skilled in the art will readily appreciate multiplication is not required since any consistent algorithm to combine scales associated with more than one dimension to produce a single weight 406 for the source pixel 400 is intended to fall within the scope of the present invention.

Furthermore, warped image 410 in some embodiments is displayed or used in a video stream 420, such that an entire video includes one or more warped images 410. In this way, a collection of input images successively associated with one another are warped collectively/selectively to produce a single video stream 420 having one or more warped images 410 according to the tenets of the present invention. Of course warped image 410, in other embodiments, is included in any print media, display media, browser media, and the like.

Figure 5:
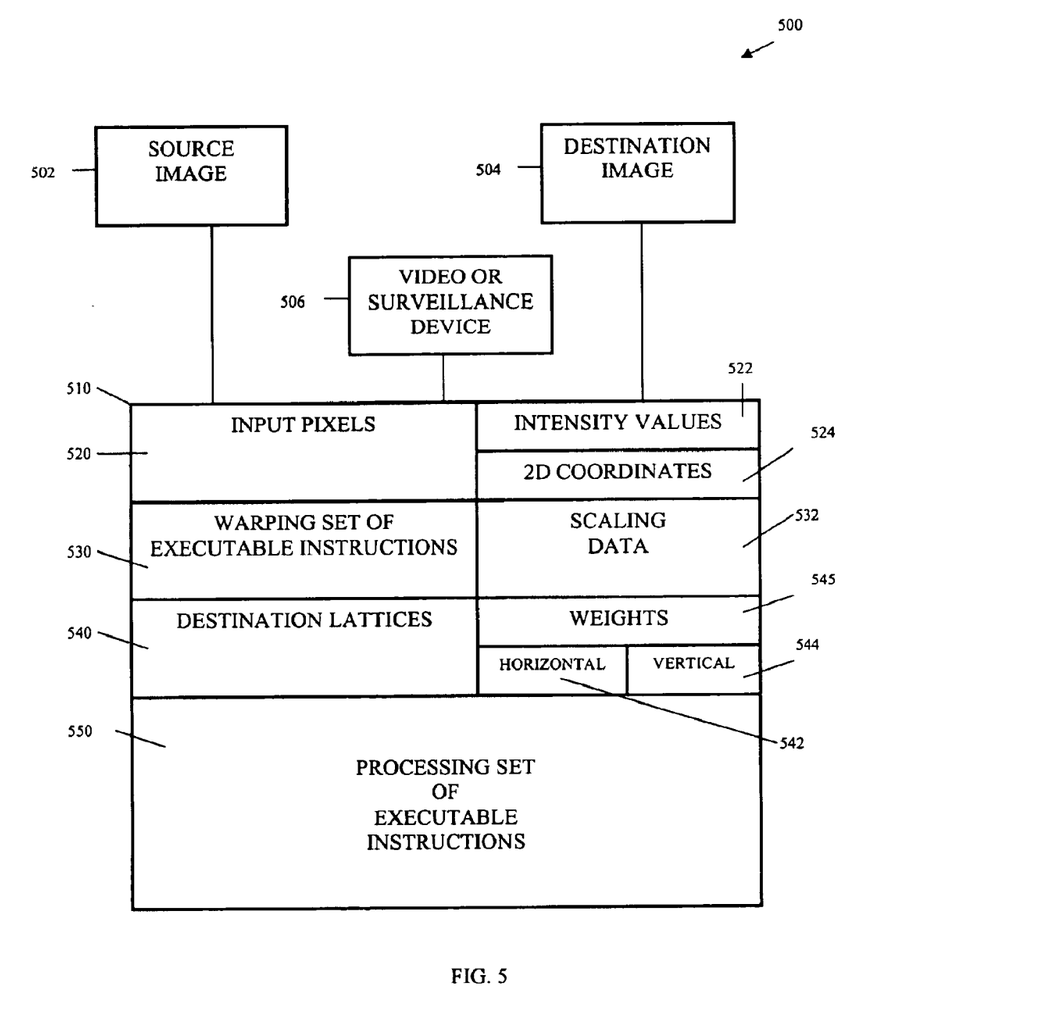
FIG. 5 is a block diagram of system to warp a source image.

FIG. 5 shows one block diagram of one system 510 to warp a source image 502 into a destination image 504. The system 510 includes input pixels 520 associated with the source image 502, each input pixel 520 has at least two-dimensional attributes identified by pixel coordinate 524. Further, each input pixel has an intensity value 522. System 510 also includes a warping set of executable instructions 530 operable to produce scaling data 532. Further, the system 510 includes a plurality of destination lattices 540, the destination lattices 540 representing warped versions of the input pixels 520 once the destination lattices 540 house the warped input pixels' 520 intensity values 522.

The scaling data 532 identifies a scale for each dimension associated with each input pixel 520, the scaling data 532 also helps in defining the destination locations and coordinates of the input pixels 520 as they appear in the destination lattices 540. In some embodiments, the scale is associated with a horizontal and vertical dimension. Moreover, the warping set of executable instructions 530 used to produce the scaling data 532 is combined to produce a single weight 545 associated with each input pixel 520, every single weight 545 representing a collection of individual weights associated with each dimension of the input pixel 520, such as a horizontal weight 542 and a vertical weight 544.

In other embodiments, the warping set of executable instructions 530 identifies a specific one-to-one mapping of the provided input pixel 520 to the destination pixel residing in the destination lattice 540. Further, a processing set of executable instructions 550 uses the destination pixels and the single weight 545 in a single operational pass against the input pixels 520 to dynamically form the destination lattices 540. The collection of destination lattices 540 forms a single destination image 504 representing a warped version of the originally provided source image 502. The warped destination image 504, in some embodiments, is representative of a stretched, compressed, scaled, and/or rotated source image 502.

In some embodiments, the warping set of executable instructions 530 is non-separable, such that the produced scaling data 532 cannot be independently segregated for each dimension. Further as one skilled in the art will readily appreciate, the resulting destination lattices 540 of system 510 are produced by continuous operation and correspondingly, in some embodiments, no additional filtering sets of executable instructions are needed to account for warping errors within the destination pixels, which comprise the destination lattices 540.

Moreover, system 510 in some embodiments is used in connection with a video and/or surveillance device. In other embodiments, system 510 is used to produce warped destination images 504 for print media, browser media, display media, and the like.

CONCLUSION

Image warping methods, data, and systems according to the tenets of the present invention provide superior warped image quality and processing throughput. Warping is performed by continuous operation, which results in less of a need to filter the resulting image produced from the warping to correct image aliasing and artifacts. Existing techniques and processes, such as the FANT process, produce artifacts since warping functions must be decomposed for each pixel dimension because warping requires two operational passes against the input source pixels. Conversely, the present invention is operational no separable and non-separable warping functions. Moreover, existing techniques and processes do not perform on both fixed-point and floating-point warping functions, as a result the warping functions available to existing techniques are constrained.

Also, although the present invention was described, by way of example only, as methods, functional data and systems to warp an image, it is readily apparent to those skilled in the art that the present invention can work equally as well in a reverse manner. For example, given a warped output image and a source image, the present invention can produce the appropriate weights associated with producing the warped output image. In this way, processing of a subsequent source image can produce a similar warped out image without the need to perform numerous computationally expensive transformation operations, since the weights necessary to the transform the subsequent source image into the similar warped image are derived using the present invention from the originally provided warped output image and source image. Thus, an entire video stream consisting of a series of still images can rapidly be warped from a single input image and a single desired output image with a desired effect.

Furthermore, each input pixel associated with a source image is processed only once with the present invention, such that no intermediate source image needs to be stored within memory during the warping process. Accordingly, real time image warping is more readily achieved, since processing latency is dramatically reduced or eliminated altogether (e.g., with the use of streaming technology) with the tenets of the present invention.

What is claimed is:

1. A method to warp a pixel, comprising:
    receiving a pixel coordinate pair having an intensity value, an x-pixel coordinate, and a y-pixel coordinate;
    identifying a pixel weight, the pixel weight representing a product of an x-pixel weight and a y-pixel weight, and wherein the x-pixel weight includes an x-scaling factor and the y-pixel weight includes a y-scaling factor; and
    using the product and the intensity value to warp the pixel coordinate air to one or more target pixel coordinate pairs.

2. The method of claim 1 further comprising using a warping function when identifying the pixel weight.

3. The method of claim 1 further successively repeating each step until remaining pixel coordinate pairs are warped to remaining target pixel coordinate pairs.

4. The method of claim 1 wherein in using the product to warp the pixel coordinate pair, one or more of the target pixel coordinate pairs represent a target pixel lattice.

5. The method of claim 1 wherein in using the product to warp the pixel coordinate pair, one or more of the target pixel coordinate pairs represent a stretched pixel coordinate pair.

6. The method of claim 1 wherein in using the product to warp the pixel coordinate pair, one or more of the target pixel coordinate pairs represent at least one of a compressed pixel coordinate pair, a translated pixel coordinate pair, and a rotated pixel coordinate pair.

7. The method of claim 1, wherein in identifying the pixel weight, the pixel weight is represented as a fixed point number or floating point number.

8. A method to warp an image, comprising:
  acquiring a plurality of input pixels associated with a source image;
  passing each of the input pixels to a warping set of executable instructions and receiving a separate scale for each of the passed input pixels;
  weighting each of the input pixels based on the separate scales as a product of the separate scales multiplied together; and
  mapping each of the input pixels to an output lattice using the separate scales.

9. The method of claim 8 further comprising producing a destination image from the mapping.

10. The method of claim 9 wherein the produced destination image represents at least one of a stretched source image, a rotated source image, and a compressed source image.

11. The method of claim 8 further comprising, associating a separate intensity value with each of the input pixels.

12. The method of claim 11 further comprising, assigning a horizontal scale and a vertical scale with each separate scale.

13. The method of claim 12, wherein the associated intensity value is fixed point.

14. The method of claim 12, wherein the associated intensity value is floating point.

15. The method of claim 8, wherein the steps are performed by a processing set of executable instructions residing on a computer readable medium with a single operational pass of the input pixels.

16. The method of claim 8, further comprising displaying the output lattice on a display.

17. A method to generate a two-dimensional pixel eight, comprising:
  acquiring a warped pixel;
  acquiring a source pixel; and
  generating a single two-dimensional pixel weight from the warped pixel and the source pixel, thereby permitting a second source pixel to be transformed into a second warped pixel using the single two-dimensional pixel weight, and wherein the single two-dimensional pixel weight is a product of each dimension's scaling factors multiplied together.

18. A warped image implemented in a computer readable medium, comprising
  one or more pixel lattices adapted to be produced from a single-pass et of executable instructions, wherein each pixel lattice is adapted to be generated from one or more source pixels and each source pixel associated with a weight representing a two-dimensional warping scale of each of the source pixels as represented in each pixel lattice, and wherein the weight is a product of separate scaling factors for each separate dimension multiplied together.

19. The warped image of claim 18, wherein the single-pass set of executable instructions includes a call to a warping function operable to assist in producing each dimensional warping scale used in the weight.

20. The warped image of claim 19, wherein the warping function is linear.

21. The warped image of claim 19, wherein the warping function is non-linear.

22. The warped image of claim 19, wherein the warped image is embodied within a video stream.

23. A system to warp a source image, comprising:
  a plurality of input pixels, each input pixel having an intensity value ahd each input pixel associated with a source image;
  a warping set of executable instructions operable to process the input pixels producing scaling data; and
  a plurality of destination lattices representing warped versions of the input pixels and produced by multiplying the scaling data to assist in generating a single two-dimensional weight for each input pixel, which when combined with each input pixel's intensity value form each of the destination lattices.

24. The system of claim 23, wherein the plurality of destination lattices form a single destination image representing a warped version of the source image.

25. The system of claim 24, wherein destination images represents at least one of a stretched version of the source image, a compressed version of the source image, and a scaled version of the source image.

26. The system of claim 23, wherein the two-dimensional weight includes a horizontal weight and a vertical weight.

27. The system of claim 23, wherein the plurality of destination lattices are formed dynamically from the plurality of input pixels.

28. The system of claim 27, wherein the input pixels are processed in a single pass by a processing set of executable instructions to form the plurality of destination lattices.

29. The system of claim 23, wherein the warping set of executable instructions is non-separable for a first dimension and a second dimension associated with the single two-dimensional weight.

30. The system of claim 23, wherein the destination lattices do not require additional filtering on destination pixels associated with each of the destination lattices.

31. The system of claim 23, wherein the system is used in connection with a video device or a security surveillance device.

32. A system to warp an image, comprising:
  a computing device;
  a display device;
  a memory;
  a source image residing in the memory having a plurality of input pixels, each input pixel including an intensity value and each input pixel associated with the source image;
  a warping set of executable instructions operable to execute on one or more processing elements within the computing device to process the input pixels producing scaling data; and
  a plurality of destination lattices displayed on the display device and presenting warped versions of the input pixels and produced by multiplying the scaling data to assist in generating a single two-dimensional weight for each input pixel, which when combined with each input pixel's intensity value form each of the destination lattices.

33. The system of claim 32, wherein the display device is at least one of a printer, a monitor, a television, a video camera, and a camera.

34. The system of claim 32, wherein the memory is at least one of a volatile storage and a non-volatile storage.

35. The system of claim 32, wherein the warping set of executable instructions is separable or non separable.

* * * * *